US009968931B2

(12) United States Patent
Zhang et al.

(10) Patent No.: US 9,968,931 B2

(45) Date of Patent: May 15, 2018

(54) RAPID AND EFFICIENT FILTERING WHOLE BLOOD IN CAPILLARY FLOW DEVICE

(76) Inventors: Nan Zhang, Cupertino, CA (US); Zhiliang Wan, Milpitas, CA (US)

( * ) Notice: Subject to any disclaimer, the term of this patent is extended or adjusted under 35 U.S.C. 154(b) by 1859 days.

(21) Appl. No.: 12/288,159

(22) Filed: Oct. 15, 2008

(65) Prior Publication Data

US 2010/0089815 A1 Apr. 15, 2010

Related U.S. Application Data

(60) Provisional application No. 61/007,578, filed on Dec. 12, 2007.

(51) Int. Cl.
*B01D 33/00* (2006.01)
*B01D 35/00* (2006.01)
*B01L 3/00* (2006.01)

(52) U.S. Cl.
CPC . *B01L 3/502753* (2013.01); *B01L 2300/0681* (2013.01); *B01L 2400/0406* (2013.01)

(58) Field of Classification Search
USPC .......................................................... 210/335
See application file for complete search history.

(56) References Cited

U.S. PATENT DOCUMENTS 4,477,575 A 10/1984 Vogel
4,678,757 A * 7/1987 Rapkin et al. ................ 436/169
4,933,092 A * 6/1990 Aunet et al. .................. 210/729
5,234,813 A * 8/1993 McGeehan et al. ........... 435/7.9
5,423,989 A * 6/1995 Allen et al. ................... 210/650
5,916,521 A 6/1999 Bunce
5,939,331 A 8/1999 Burd
6,197,598 B1 3/2001 Schrier
6,391,265 B1 5/2002 Buechler
6,465,202 B1 * 10/2002 Tyrrell ............................ 435/15
2001/0037078 A1 11/2001 Lynn
2003/0035758 A1 2/2003 Buechler
2004/0035792 A1 2/2004 Rauch
2006/0246600 A1 11/2006 Yang
2007/0031283 A1 * 2/2007 Davis et al. .................... 422/58

FOREIGN PATENT DOCUMENTS

EP 0194502 A2 9/1986
WO WO 94/18559 A1 8/1994

OTHER PUBLICATIONS

European Search Report dated Jan. 9, 2014, for related application EP08858843.9.

* cited by examiner

*Primary Examiner* — Dirk Bass
(74) *Attorney, Agent, or Firm* — BioPatent IP; Gary Baker

(57) ABSTRACT

This invention provides lateral flow filters with pore size gradients and with features to prevent peripheral flows around the filter. The filters can be laminated composites of two or more planar filter layers. Cartridges employing the filters can include a filtration chamber configured to retain the lateral flow filters including a port for sample application and a capillary channel for filtrate egress. The fluid egress port can be positioned to receive filtrate from one filter layer but not another.

14 Claims, 4 Drawing Sheets

RAPID AND EFFICIENT FILTERING WHOLE BLOOD IN CAPILLARY FLOW DEVICE

CROSS-REFERENCE TO RELATED APPLICATIONS

This application claims priority to and benefit of a prior U.S. Provisional Application No. 61/007,578, Rapid and Efficient Filtering Whole Blood in a Capillary Flow Device, by Nan Zhang, et al., filed Dec. 12, 2007. The full disclosure of the prior application is incorporated herein by reference.

FIELD OF THE INVENTION

The invention is in the field of lateral flow filtration elements and cartridges employing such filter elements to separate particles from sample suspensions. The filters can include a fluid flow along the length of a planar filter to exit as filtrate into a capillary channel. The filters can be two or more filter elements laminated, e.g., with larger pores at the point of sample application than at the region of filtrate egress.

BACKGROUND OF THE INVENTION

Diagnostic tests frequently are performed on biological samples, such as whole blood or urine that include substantial amounts of particulate matter that can clog microchannels of an assay device and interfere with reaction and detection systems. To avoid the problem of particulate in clinical samples, they are typically centrifuged or filtered before sample analysis.

Particulate removal by filtration in the prior art has largely focused on forced transverse flow mechanisms. To achieve removal of particulates, incorporation of a filter into an assay device has been described in the prior art. For example, U.S. Pat. No. 4,477,575, to Vogel, et al. “Process and Composition for Separating Plasma or Serum from Whole Blood” uses a transverse flow of blood through stacked filter elements filter to separate red blood cells from plasma. However, sealing of the filter in the device to achieve effective filtration, and not allow sample to bypass the filter, is a problem with this technology. The products are bulky in thickness. A small capillary or gap between the filter and the filter chamber walls can allow peripheral non-filtering flows. Particulate matter which travels around the filter decreases the filtration efficiency, repeatability, and may cause the filter to be unacceptable for certain applications. Techniques, such as using glues, tapes and the like have been used to seal a filter into the filter chamber of such devices. The use of these materials to affect sealing has produced variable, and often poor sealing. Additionally, these sealing methods can result in absorption of variable amounts of the sealing compound into the filter.

Another drawback of prior art filter devices is the short transverse fluid flow path through a filter’s depth. Transverse flow paths in a conventionally shaped filter (a filter with a length, width and substantially thinner depth) is the distance between the top and the bottom of the filter, the filter depth commonly referred to as the filter thickness. Filters are generally 0.1 mm to 6 mm thick, this short flow path can provide poor separation efficiency.

An alternate filter configuration would be to provide a filter with a long lateral flow path, such as is described in “Devices for Incorporating Filters for Filtering Fluid Samples”, U.S. Pat. No. 6,391,265, to Buechler, et al. Buechler applies sample fluid to one end of a planar filter and collects filtrate at the other end of the same filter. However, this single filter technology has the disadvantage that the same filter dealing with the gross particulate of the sample also has to handle the final fine filtration.

In view of the above, a need exists for a specialized filtration system that can remove bulk particulates from fluids in a thin package without clogging or peripheral flows. It would be desirable to have a filter that addresses both large bulk particulates and fine particulates in a long flow path without the need for pressurized flows. The present invention provides these and other features that will be apparent upon review of the following.

SUMMARY OF THE INVENTION

The present inventions are directed to lateral flow filters and cartridges configured to effectively employ them. A typical filter of the invention includes two or more planar filter layers with the top filter disposed upon a lower filter but not coextensive to the downstream terminus. A typical cartridge includes a filtration chamber to hold the filter system so that sample applied on the upstream top of the laminated filter elements flows laterally to exit the chamber as a filtrate into a capillary channel only from a filter element layer below the top filter element.

The filters of the invention for separating particles from a fluid include, e.g., a first (bottom) filter element comprising a fluid egress surface, a second filter element disposed upon the first filter element but not coextensive with the first filter element at the fluid egress surface, which second filter element comprises a fluid application surface, and a lateral fluid flow path from the application surface to the fluid egress surface. With this arrangement, a fluid applied to the application surface can flow transversely into the second filter and laterally through the second filter to the fluid egress surface.

In preferred embodiments, the filter system consists of two planar filter elements, one on top of the other, and having different pore sizes. The filter systems are typically planar and can be characterized by a length, a width and a thickness. Typically, the length is at least two times the width and at least 10 times the thickness. The relatively long filters with a thin aspect ratio provide for filtration through a lateral fluid flow path running substantially parallel to a length dimension of the filter. For initial filtration of whole blood, it is preferred that the top filter (e.g., with the sample application surface) have a pore size of about 6 μm or less (red cells being about 6 to 8 μm diameter). In most cases the pore size of filter elements beneath the top filter element have a pore size less than the bottom of the top filter element. In a preferred embodiment, the top and/or bottom filter elements comprise a pore size gradient through the thickness (transversely through the depth) of the filter element. To put a stop limit on capillary flow between the filter system and filtration chamber surfaces, and/or to impend flow of particles and fluid through designated filter regions, the filter elements can have a crush line impressed through the thickness, e.g., downstream from the application surface and/or at a peripheral edge. To further reduce fluid migration from the filter at designated surfaces, filter elements can receive a hydrophobic coat.

Capillary cartridges of the invention include a filter of the invention nestled in a filtration chamber configured for application of fluid sample near one end, and egress of filtrate into a capillary chamber at the other end, of the filter through a lateral fluid flow path. An exemplary cartridge includes a substrate comprising a filtration chamber, a cover substantially overlying the substrate and comprising a sample application port, a filter assembly held in the filtration chamber with a bottom filter element having a fluid egress surface, and a top filter element disposed upon the bottom filter element but not coextensive with the bottom filter element at the fluid egress surface. The top filter element has the fluid application surface in fluid contact with the sample application port, and the fluid egress surface of the bottom filter is in fluid contact with a capillary outlet from the filtration chamber. The capillary outlet is typically in capillary fluid contact with a downstream assay system comprising, e.g., a reaction chamber and a detection chamber.

In another aspect, the capillary cartridges can have coextensive filter elements, but only the bottom filter is in direct contact with the capillary channel at the outlet of the filtration chamber. For example, a capillary cartridge can have a substrate comprising a filtration chamber, a cover substantially overlying the substrate and comprising a sample application port, a capillary outlet from the filtration chamber; and, a filter assembly held in the filtration chamber with a first filter element comprising a fluid egress surface in contact with the capillary outlet, and a second filter element comprising a fluid application surface in fluid contact with the sample application port and disposed upon the first filter element but not in contact with the capillary outlet. The sample application port and capillary outlet can be configured in the cartridge structure to provide a lateral fluid flow path running from the fluid application surface to the fluid egress surface. The first filter element and second filter element are optionally not coextensive, e.g., with the top filter element shorter (less lengthy) than the bottom filter element, so the top element does not reach the capillary outlet. Alternately, the first and second filter elements can be substantially coextensive, e.g., but with the capillary outlet only in contact with the egress surface of the bottom filter element. The egress surface of the lower filter element can include the filter edge and/or part of the filter bottom surface. When the top and lower filter elements are not coextensive, the egress surface can include, e.g., part of the lower filter element top surface, edge and/or bottom surface.

The cartridge can have additional features to influence fluid flows. For example, the filtration chamber can have a bottom surface with v-shaped (in cross section) groves running parallel to the lateral fluid flow path. The cartridge internal surfaces can have recesses that recede from fluid channels providing non-capillary dimensions that stop undesirable flows along surfaces, e.g., that may circumvent the filter materials. In a preferred embodiment, cartridge has a recess in the cover at a position overlying a filter crush line, thus preventing filtrate or particles from moving above the filter system by capillary action and directing filtrate down into the bottom filter.

DEFINITIONS

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms “a”, “an” and “the” include plural referents unless the content clearly dictates otherwise. Thus, for example, reference to “a component” can include a combination of two or more components; reference to “a capillary channel” can include one or more channels, and the like.

Unless defined otherwise, all technical and scientific terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

The term “coextensive”, as used herein with regard to filter systems, refers to one filter element disposed upon another filter element so that neither filter extends beyond the other. For example, where two planar filters are coextensive when they have the same length and width and are positioned together with their edges in alignment. When a first filter of length 10 mm is disposed upon a second filter of length 18 mm, the filters would not be coextensive, but include, e.g., 8 mm of the second filter that is not overlapping the first filter.

A “lateral fluid flow path” in a planar filter runs substantially parallel to the planar surface. That is, a straight line drawn from the point of fluid sample application on the filter to the point where the bulk of the filtrate flow exits the filter in use runs generally parallel to (e.g., within 20°, 10°, 5°, or 2° of) the planar surface of the filter. For example, fluid typically flows in a lateral flow path through a filter paper sheet when filtrate is collected some distance from the point of application; and would not be considered lateral flow when the filtrate is collected on the other side of the paper directly across the thickness from the point of application (transverse flow). Of course, fluids applied to a filter will run in all directions, but the current definition is concerned with the overall bulk flow direction of the fluid.

Downstream is in the direction of fluid flow.

As used herein, a peripheral edge of a planar filter is the thin surface exposing the thickness of the filter, e.g., as in common usage of the term. As used herein, directional terms, such as “upper”, “lower”, “top”, and “bottom” are as in common usage, e.g., with reference to a planar cartridge disposed upon a table with the cover side facing up.

As used herein, “substantially” refers to largely or predominantly, but not necessarily entirely, that which is specified.

The term “about”, as used herein, indicates the value of a given quantity can include quantities ranging within 10% of the stated value, or optionally within 5% of the value, or in some embodiments within 1% of the value.

DETAILED DESCRIPTION

Figure 1:
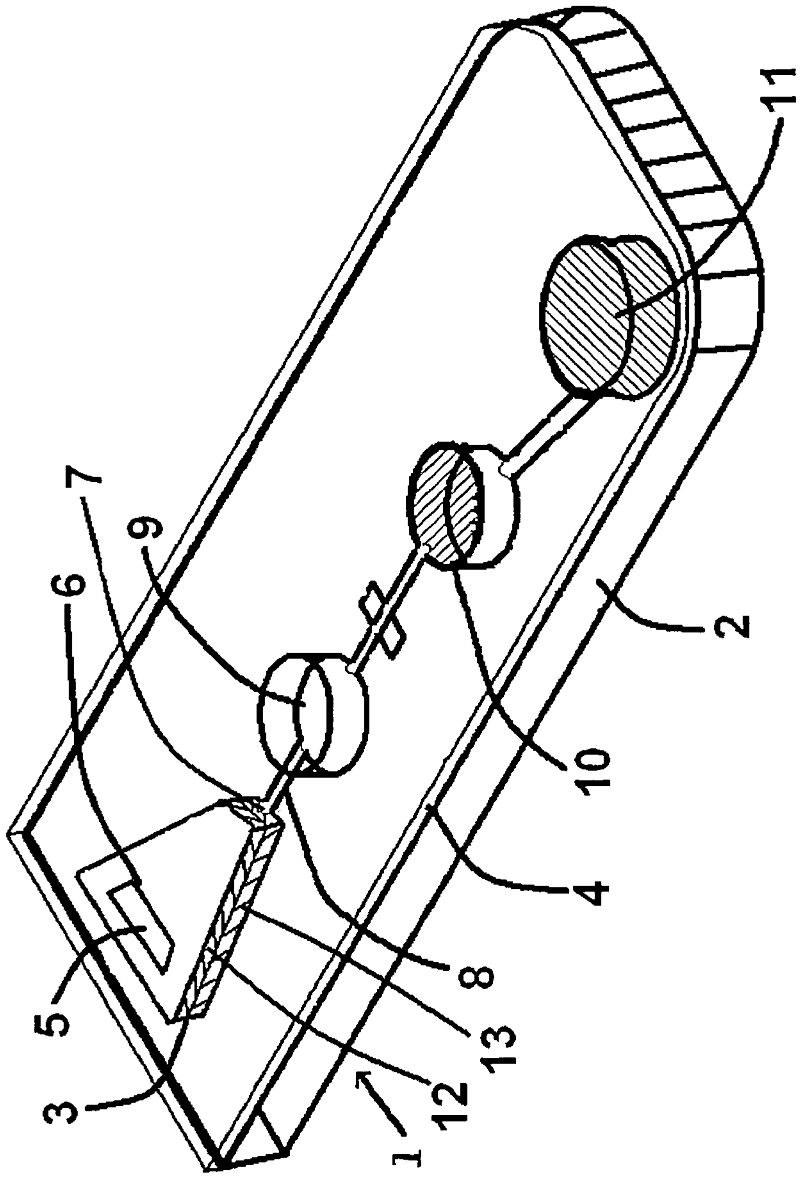
FIG. 1 is a schematic diagram of an exemplary capillary cartridge of the invention

The invention relates to filters for rapid and efficient separation of particles from fluids through an on-cartridge-filtration system. In particular, this invention relates to a filtration system of two or more filter elements that filters whole blood and introduces the filtrate into capillary channels without the use of any external applied force. A capillary cartridge system can include multiple membranes with varying pore size and configurations, a filtration chamber, a sample application port, fluid application surface of a filter, filtrate egress surface of a filter, and a capillary outlet to one or more capillary channels and/or capillary spaces.

Filter systems of the invention are generally laminated, lateral flow, filters including a pore size gradient through their thickness or through a substantial portion of their thickness. The top filter element of the system typically has a course-pored surface to receive fluids with suspended particles, such as, e.g., whole blood, suspension cell cultures, saliva, urine, etc. The top filter element overlays, e.g., all or a substantial portion of the bottom filter element and feeds the bottom filter with relatively coarsely filtered fluid. The bottom filter typically extends at least some distance downstream from the top filter so that filtrate flows laterally some distance beyond the top filter before exiting the bottom filter into a capillary channel or chamber. Optionally, the top filter element and one or more lower filter elements are coextensive throughout their length (e.g., with filtrate egress from the edge of the bottom filter).

The cartridges include, e.g., a covered substrate with capillary channels and a filter holder. The cartridges are typically substantially planar thin devices longer in one dimension than another. In preferred embodiments, the substrate can be a substantially planar cartridge base with micromachined structures, such as, e.g., a filter holding (filtration) chamber, micro channels, reaction chambers, micro valves, detection chambers, and waste chambers. The substrate can be overlaid with a substantially planar cover, e.g., laminated to the top of the substrate in substantially the same plane as the substrate. With the cover sealed over the substrate, functional capillary spaces can be formed, e.g., allowing a fluid with significant surface tension and affinity for cartridge surfaces (such as, aqueous solutions, polar solvents or even organic solvents) to flow through the cartridge without requiring application of external force (such as, pneumatic pressure, hydrostatic pressure or centrifugal force). The filter holding chamber can closely hold a filter system of the invention and be at least partially covered by the cover. The cover can include a port in fluid contact with the upper filter surface, so that samples of interest can be applied to the filter for filtration and capillary flow throughout the capillary microchannels of the cartridge.

The cartridges of the invention provide many benefits, such as an easily manufactured design with a simple substrate and cover serving as the filter holders without a requirement for a third part for mounting filters. The cartridges provide simple structures to prevent whole blood from bypassing the filter, particularly at the plasma outlet (filtrate egress surface). The cartridges tend to minimize filtrate retention and maximize the plasma outflow volume. The cartridges increase the flow rate through filters as well as through the capillary channels. The cartridges inhibit pooling of whole blood samples or plasmas between superposed filter layers.

Lateral Flow Filters

Filters of the invention efficiently separate particles from fluid samples, e.g., to prevent clogging of downstream microchannels and to prevent assay interference from particles. The filters are generally planar filters with a length and (usually) width substantially greater than the thickness of the filters. The filters are designed to function with filtrate flows laterally across the plane of the filters. The filter systems can include two or more individual filters stacked, one upon another, e.g., with coarser pored (larger pore sized) filters positioned more toward a sample input surface and finer pored filter elements positioned more toward a filtrate egress (output) surface. The filters can include any of a variety of features to influence flow rates and directions, often in combination with features of an associated micro-capillary assay cartridge.

Figure 2:
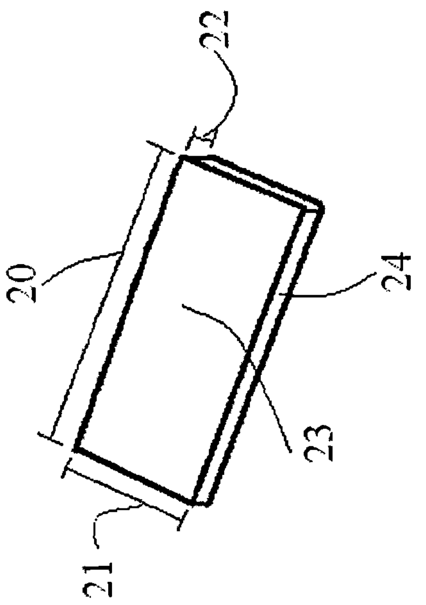
FIG. 2 is a schematic diagram illustrating dimensions of planar laminar fluid flow filters.

Filter systems of the invention can have dimensions appropriate to particular applications. As shown in perspective FIG. 2, the filters can have a length 20, width 21, and depth (thickness) 22, with the length and width substantially greater than the thickness. For example, the length and width of the filters ranging from more than about 10 cm to less than about 0.1 cm, from 5 cm to 0.3 cm, from 2 cm to 0.5 cm, or about 1 cm. The filter thickness typically ranges from more than about 5 mm to less than about 0.1 mm, from 3 mm to 0.25 mm, from 2 mm to about 0.5 mm, or about 1 mm. In more typical embodiments, the filter has a length longer than width, and a thickness much smaller than the length. For example, the length is typically at least twice the width, and at least 10 times the thickness of the filter. We note that filter elements can have a top surface 23, edge 24 and bottom surface (not shown).

The filter systems are configured to provide an effective, efficient and low dead volume lateral flow filtration of particles from an input fluid suspension. One in the art knows that a fluid migrating through a filter generally can flow in any direction. However, over the course of a filtration, the average or bulk of the fluid flow can described a flow path, typically directly from the surface region of sample fluid application to the surface region of filtrate egress from the filter. In the present filter systems, fluids typically flow in a lateral flow path that may initially include a significant flow down into the thickness of the filter system, but the flow includes a predominant flow laterally across the plane of the filter along the length and width (typically predominantly along the length) of the filter. The lateral flow filtrate typically exits the filter from the edge of the one or more filter elements furthest from the sample application surface. Optionally, the filtrate exits the filter in a flow out of a top or bottom surface of the filter element (typically at a point not coextensive with the upper filter).

In preferred embodiments, the filter includes larger pore sizes at the top of the filter and/or at the input surface and smaller pores in the region of the egress surface. For example, in one embodiment, the upper filter with the sample fluid application surface can have a larger pore size than the lower filter with the egress surface where filtrate exits the filter. In preferred embodiments, the top filter element has an average pore size ranging from about 100 μm to about 1 μm, from about 20 μm to about 2 μm, from about 10 μm to about 4 μm, or about 6 μm. In preferred embodiments, the one or more lower filter elements with the egress surface, e.g., in contact with a capillary channel of an assay cartridge, has an average pore size ranging from about 10 μm to about 0.1 μm, from about 6 μm to about 0.5 μm, from about 5 μm to about 1 μm, or about 2 μm. For example, it can be desirable to exclude particles at least the size of red blood cells from entry into the top filter and to exclude particles at least the size of platelets from entry into the bottom filter. In a preferred embodiment, at least one filter element of the filter includes a pore size gradient with larger pores on the top surface and a gradient of pore sizes to smaller pores at the bottom surface. In a more preferred embodiment, the top filter is a gradient filter with pore sizes ranging from 50 μm near the top surface to 0.1 μm at the bottom surface, from 20 μm near the top surface to 0.2 μm at the bottom surface, from 10 μm near the top surface to 0.5 μm at the bottom surface, or from 5 μm near the top surface to 1 μm at the bottom surface.

In some embodiments, it can be beneficial to have a relatively hydrophobic coating or layer on outer surfaces of the filter. For example, a silicone based, fluorocarbon or plastic surface can be applied to the top surface of the top filter, peripheral edges of one or more laminated filter elements, and/or the bottom of the bottom filter. Such hydrophobic materials can reduce the tendency of samples or filtrates to flow by capillarity around the filter elements, e.g., in any space between the filters and the filtration chamber surfaces.

To increase the filtration speed or rate, it can be desirable to soak the filter in a hydrophilic detergent, then dry before usage. The detergent can be Twin 20 or Pluronic 192 or the like. When the whole blood is filtered through the hydrophilic-detergent-treated filters, the surface energy reduces and hence the flow speed can be increased.

In another aspect of the invention, one or more filter elements of the filter can have a crush zone wherein pores of the filter are compressed, e.g., to effectively provide a smaller pore size at certain desired regions of the filter. In a typical embodiment, one or more crush lines can be formed, e.g., in a linear region across the filter to restrict fluid flow in the region and/or to pull the filter surface away from another cartridge surface. For example, crush lines can be employed around peripheral edges of a filter to reduce fluid or particle flows that might circumvent the intended fluid flow path. Such crush lines can be formed in a filter or in a stack of two or more filters, e.g., by simply applying high pressure at the desired location, applying heat to the location, applying light energy to the location, applying sonic energy to the location, and/or the like. In a preferred embodiment, a crush line is applied to a filter by applying pressure to the filter with a sonicator tip and applying sonic energy.

Cartridges with Lateral Flow Filters

Cartridges of the invention are typically sample analysis cartridges for processing, reaction and detection of a sample analyte. The cartridges include a lateral flow filter, as described herein. In a general embodiment shown in FIG. 1, the cartridges 1 include, e.g., a micromachined substrate 2 retaining a lateral flow filter system 3 and overlain with a cover 4. A fluid sample can be applied to a fluid application surface 5 of the filter through a sample application port 6 of the cover. Filtrate of the fluid can flow ultimately along a lateral fluid flow path to a fluid egress surface 7 of the filter to enter a capillary channel 8 and/or capillary space. The lateral flow path typically begins in the region of the input surface of a top filter element and runs laterally to exit the egress surface of a lower filter element. The fluid flows are preferably driven by capillary interactions, e.g., between the fluid and the surfaces of the cartridges. On leaving the filtration chamber, filtrate can flow by capillary action, e.g., to a reaction chamber 9, to a detection chamber 10, and ultimately to a waste chamber 11. Although the filtration system can comprise two or more filter elements, the embodiment of the Figure includes a top (upper) filter element 12 and bottom (lower) filter element 13.

The cartridges of the invention typically have a layered structure, with the substrate layer being made of plastics, PDMS, SU-8, thermoplastic or thermosetting plastics are general-purpose polystyrene, high impact polystyrene, methacrylate resin, polyethylene, polypropylene, polyester, nylon, polycarbonate, other plastic materials, etc. The formation of a first substrate layer can be accomplished by, e.g., hot embossing, plastic molding, etching, grinding, pressing, and/or the like. The cartridge can optionally include an alternate or second substrate layer, e.g., semiconductor die that is micromachined on a silicon substrate, a glass substrate, a quartz substrate, or other substrates. The cartridge can include a cover layer that can be the same material as the first layer, or another type of plastic material. The substrate typically provides the layout for chambers and capillary spaces in the cartridge. The cartridge layers can be assembled by alignment, then bonding and sealing. Typically, at least one surface of the chamber, channel or capillary spaces is provided by lamination and sealing the cover over the substrate. Fitting of the cover to the substrate can be by any means such as adhesion using adhesive tapes, glues, metallic binding, fusion welding, ultrasonic welding, laser welding, and/or the like. In many embodiments, the lateral flow filter system is inserted into a filtration chamber of the substrate before bonding of the layers.

The surfaces of the components mentioned above can optionally be coated with hydrophilic materials to increase the capillarity with aqueous fluids and to increase the flow rate. The flow rates can also be affected by the capillary channel cross sections. In preferred embodiments, the capillary channels and/or chambers have at least one cross sectional dimension less than 1 mm, less than 0.5 mm, less than 0.25 mm, less than 0.15 mm, less than 0.1 mm or about 0.05 mm. In typical embodiments, the preferred channel height is 120 μm to 130 μm.

Although the type of filtering material is not limited in the invention, it is preferred that the filter material to be used is asymmetric, i.e., a graduated or stepped pore size structure consisting of more open pores on the upstream side with finer pores on the downstream side. A high degree of asymmetry allows, e.g., red blood cells to be captured in the larger pores while the plasma wicks into the smaller pores on the downstream side of the membrane. This type of filter can be configured to not only trap blood cells on the surface, but can capture blood cells gradually by entangling first large blood cell components and then smaller blood cell components in the filter's space structure as the average effective pore size decreases through the depth of the filter.

EXAMPLES

The following examples are offered to illustrate, but not to limit the claimed invention.

Example 1

A Lateral Flow Filter in a Cartridge

An assay cartridge is prepared incorporating a lateral flow filter system having a pore size gradient. Such a cartridge can efficiently provide filtered plasma to an assay system with low dead volumes and high flow rates without a requirement for input of external forces.

Figure 3:
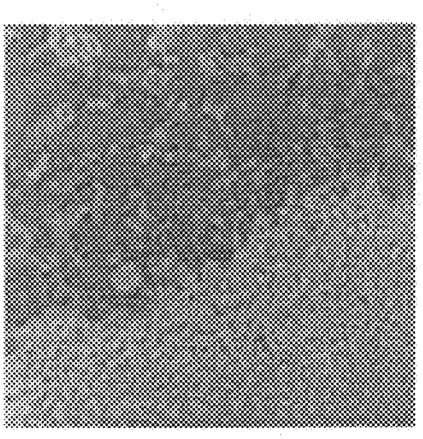
FIG. 3 is a microphotograph of a preferred filter element for use in the filters of the invention.
Figure 4:
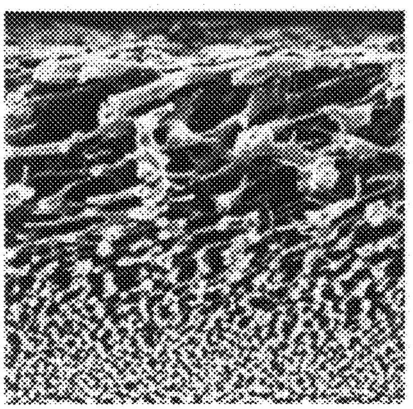
FIG. 4 is a microphotograph of a preferred filter element for use in the invention including a gradient of pore sizes.

The cartridge employs two asymmetric gradient filters. A suitable asymmetric filter is Pall BTS-SP-300 GR (see, FIG. 3) or the like, which have a thickness of 300 um. To avoid excessive sample volume requirements, it is not preferred to laminate two or more asymmetric filters with the same pore size to merely increase the filtration path length. Such a configuration can trap whole blood or plasma between filter layers due to the capillary stop effect of a larger pore size along the flow path. For example, to laminate two layers of BTS-SP-300 GR will increase the sample volume and the blood samples will be accumulated in the gap between two layers. However, we have found it beneficial to employ a super-micron filter, such as Pall MMM series membrane (see, FIG. 4), as a top filter over a bottom BTS-SP-300 GR filter. The Pall MMM has a slightly larger pore sizes on the bottom of membrane comparing to the top of the asymmetric BTS-SP-300 GR filter underneath. The top gradient filter can deal with blood components of various sizes while the bottom asymmetric membrane provides good filtration of small particles while providing low volume and high fluid flows. The asymmetric filters can be highly porous and inherently wettable without the use of additional wetting agents. The bottom filter was also chosen for its low protein binding characteristics. The preferred MMM top filter pore size is 5-10 um. The two different filters can be superposed by pressing a "crush" line along the periphery of the blood filtering material. The "crush" method can be ultrasonic or the like, as described above.

By combining super-micron filters such as MMM with BTS-SP-300 GR, any blood cells leaking from the super micron filters are caught by the BTS filters, and a desired volume of the plasma can be obtained. The suitable thickness of the asymmetric filter varies according to the plasma volume to be recovered, void volume and area of the filter. Taking Pall's BTS-SP-300 GR and MMM filter as an example, a filter of 400-600 um combined thickness, and 3 cm square area, is suitable for obtaining 100 ul plasma.

To enhance the efficiently filtrate flow from the filter inlet region, v-shaped grooves structures are built on the inlet chamber bottom surface. These grooves help channel air out of the filter region to prevent air entrapment between filter paper and substrate. However, the v-groove numbers and height have to be balanced against the plasma retaining volume within the v-grooves.

A capillary device can be assembled to combine aspects described herein. For example, an immunoassay cartridge can be provided with a crush assembled pore size gradient stack of blood filtering material placed into filter holder region having a blood inlet and a plasma outlet. The filter region is, in general, formed of a cartridge substrate containing the built-in v-grooves running toward the outlet at the bottom of the filter region and a cover containing the filter materials. The cover has at least one aperture for input or outlet of fluid materials. Here, a blood inlet aperture was provided in the cover adjacent to the gradient filter top surface to ensure a uniform blood distribution on the surface of filter membrane.

The periphery of the blood filtering material is hard "crushed" to prevent unfiltered material from flowing around the filter edges, e.g., to the filter region outlet, without being effectively filtered. In particular, edge crushing can prevent red cells from passing over the filter top surface to an edge space or through the top large pore zone to the filter edge without complete filtration. For example, the crushing can functionally reduce the average pore size in the region and/or recess the filter from contact or proximity to other cartridge surfaces, thus reducing circumventing capillary flows.

Figure 5:
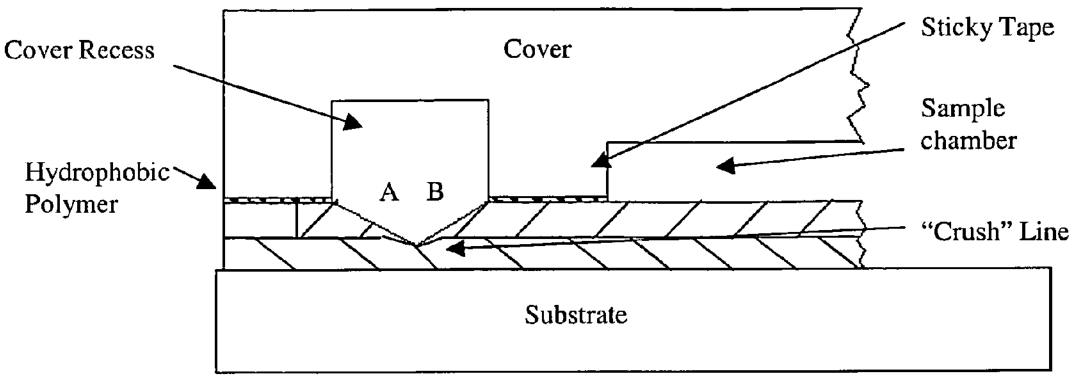
FIG. 5 is a schematic diagram of a cartridge cross-section through laminated filter elements.

A layer of double stick tape is attached onto the periphery of the blood filtering material, but inside the "crush" line (FIG. 5) to further to prevent whole blood from bypassing the intended flow path through the filtering material.

Whole blood is further prevented from circumventing the intended flow path by providing a "crush" line in the upper filter (but, optionally, not in the bottom filter) of the stack at a line below a recess in the cover. Such recesses and crush lines can provide capillary stop spaces that stop fluid and particle flow around the peripheral surfaces of the filter elements of the cartridge.

To further prevent the leakage characterized above; a hydrophobic polymer can be applied on top of the filters. The preferred applied location is on top of the filter adjacent to the plasma outlet port.

It is understood that the examples and embodiments described herein are for illustrative purposes only and that various modifications or changes in light thereof will be suggested to persons skilled in the art and are to be included within the spirit and purview of this application and scope of the appended claims.

While the foregoing invention has been described in some detail for purposes of clarity and understanding, it will be clear to one skilled in the art from a reading of this disclosure that various changes in form and detail can be made without departing from the true scope of the invention. For example, many of the techniques and apparatus described above can be used in various combinations.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A filter system for separating particles from an aqueous fluid, the system comprising:
- a first filter element configured for capillary flow of the aqueous fluid and comprising a fluid egress surface;
- a second filter element disposed upon the first filter element but not coextensive with the first filter element, and wherein the fluid egress surface is at a region of the first filter which is not coextensive with the second filter, which second filter element comprises a fluid application surface; and,
- a lateral fluid flow path from the application surface to the fluid egress surface;
- wherein the filters and egress surface are arranged so that a fluid applied to the application surface flows into the second filter and laterally through the first filter and out from the fluid egress surface through a capillary outlet,
- wherein the second filter further comprises an upper surface with a hydrophobic coat.

2. The filter system of claim 1, wherein the filter comprises a length, a width and a thickness, and wherein the length is at least two times the width and at least 10 times the thickness.

3. The filter system of claim 1, wherein the lateral fluid flow path runs substantially parallel to a length dimension of the filter.

4. A filter system for separating particles from an aqueous fluid, the system comprising:
- a first filter element configured for capillary flow of the aqueous fluid and comprising a fluid egress surface;
- a second filter element disposed upon the first filter element but not coextensive with the first filter element, and wherein the fluid egress surface is at a region of the first filter which is not coextensive with the second filter, which second filter element comprises a fluid application surface; and,
- a lateral fluid flow path from the application surface to the fluid egress surface;
- wherein the filters and egress surface are arranged so that a fluid applied to the application surface flows into the second filter and laterally through the first filter and out from the fluid egress surface through a capillary outlet 1, wherein the first or second filter element comprises a crush line downstream from the application surface or at a peripheral edge.

5. The filter system of claim 4, wherein the egress surface comprises a top surface, edge surface or bottom surface of the first filter element.

6. A capillary cartridge comprising:

a substrate comprising a filtration chamber;

a cover substantially overlying the substrate and comprising a sample application port;

a filter assembly held in the filtration chamber and comprising a first filter element comprising a fluid egress surface, a second filter element disposed upon the first filter element but not coextensive with the first filter element at a region that includes the fluid egress surface, which second filter element comprises a fluid application surface in fluid contact with the sample application port;

a capillary outlet from the filtration chamber, which capillary outlet is in fluid contact with the fluid egress surface 9, wherein the first or second filter element comprises a crush line downstream from the application surface or at a peripheral edge.

7. The cartridge of claim 6, further comprising a recess in the cover at a position overlying the crush line.

8. The cartridge of claim 6, wherein the second filter further comprises an upper surface with a hydrophobic coat.

9. The filter of claim 6,, wherein the egress surface comprises a top surface, edge surface or bottom surface of the first filter element.

10. A filter system for separating particles from an aqueous fluid, the system comprising:

a first filter element configured for capillary flow of the aqueous fluid and comprising a fluid egress surface;

a second filter element disposed upon the first filter element but not coextensive with the first filter element, and wherein the fluid egress surface is at a region of the first filter which is not coextensive with the second filter, which second filter element comprises a fluid application surface; and, a lateral fluid flow path from the application surface to the fluid egress surface;

wherein the filters and egress surface are arranged so that a fluid applied to the application surface flows into the second filter and laterally through the first filter and out from the fluid egress surface through a capillary outlet, wherein the first filter element aqueous fluid egress surface is in fluid contact with a assay system downstream from the egress surface, wherein the assay system comprises a reaction chamber or a detection chamber.

11. A capillary cartridge comprising:

a substrate comprising a filtration chamber;

a cover substantially overlying the substrate and comprising a sample application port;

a filter assembly held in the filtration chamber and comprising a first filter element comprising a fluid egress surface, a second filter element disposed upon the first filter element but not coextensive with the first filter element at a region that includes the fluid egress surface, which second filter element comprises a fluid application surface in fluid contact with the sample application port;

a capillary outlet from the filtration chamber, which capillary outlet is in fluid contact with the fluid egress surface, wherein the capillary outlet is in fluid contact with a assay system downstream from the capillary outlet, wherein the assay system comprises a reaction chamber or a detection chamber.

12. The filter system of claim 1, wherein said flow through the capillary outlet is by capillary action.

13. The filter system of claim 1, wherein the fluid egress surface is in direct contact with the capillary outlet.

14. The filter system of claim 13, wherein the capillary outlet is between the egress surface and a capillary channel.

* * * * *